(12) United States Patent
Sugiyama

(10) Patent No.: US 12,056,556 B2
(45) Date of Patent: Aug. 6, 2024

(54) IMAGE FORMING DEVICE

(71) Applicant: TOSHIBA TEC KABUSHIKI KAISHA, Tokyo (JP)

(72) Inventor: Hiroyuki Sugiyama, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 17/830,385

(22) Filed: Jun. 2, 2022

(65) Prior Publication Data
US 2023/0032555 A1    Feb. 2, 2023

(30) Foreign Application Priority Data

Aug. 2, 2021   (JP) ................ 2021-126477

(51) Int. Cl.
  *G06K 7/00* (2006.01)
  *B65H 7/06* (2006.01)
  *G06K 5/00* (2006.01)

(52) U.S. Cl.
  CPC ............. *G06K 7/0008* (2013.01); *B65H 7/06* (2013.01); *G06K 5/00* (2013.01); *B65H 2301/51432* (2013.01)

(58) Field of Classification Search
  CPC .... G06K 7/0008; G06K 5/00; G06K 17/0025; B65H 7/06; B65H 2301/51432; B65H 5/062; B65H 2701/1244; G03G 15/6582; G03G 15/6591
  USPC ................................ 340/10.1, 10.6
  See application file for complete search history.

(56) References Cited

U.S. PATENT DOCUMENTS

| | | | |
|---|---|---|---|
| 6,404,335 B1 * | 6/2002 | Ohno | G06K 1/121 340/5.1 |
| 7,283,759 B2 * | 10/2007 | Takahashi | G03G 15/2039 399/329 |
| 7,341,326 B2 | 3/2008 | Kondo et al. | |
| 7,962,658 B2 | 6/2011 | Kanoshima et al. | |
| 8,054,484 B2 * | 11/2011 | Hosokawa | G06K 17/0025 358/1.14 |
| 8,145,086 B2 * | 3/2012 | Chiyoda | G03G 15/657 399/33 |
| 9,256,177 B2 * | 2/2016 | Watanabe | G03G 15/2032 |
| 10,558,151 B2 * | 2/2020 | Hirota | G03G 15/2017 |
| 11,080,575 B2 * | 8/2021 | Takada | G06K 19/07749 |

(Continued)

FOREIGN PATENT DOCUMENTS

JP    2018-134762    8/2018

*Primary Examiner* — Nam V Nguyen

(74) *Attorney, Agent, or Firm* — Amin, Turocy & Watson, LLP

(57) ABSTRACT

An image forming device capable of reducing resources related to destruction of a wireless tag is provided. The image forming device according to the present embodiment includes a reader and writer, a fixing unit, a determination unit, and a control unit. The reader and writer reads information from the wireless tag. The fixing unit heats and conveys a sheet having the wireless tag. The determination unit determines a defect of the wireless tag based on a reading result of the reader and writer. If the determination unit determines that the wireless tag is defective, the control unit controls the fixing unit to increase an amount of heat applied to the wireless tag such that information cannot be read from the wireless tag.

17 Claims, 6 Drawing Sheets

(56) References Cited

U.S. PATENT DOCUMENTS

| | | | | |
|---|---|---|---|---|
| 2005/0025511 A1* | 2/2005 | Watabe | ............. | G03G 15/2032 |
| | | | | 399/68 |
| 2012/0263487 A1* | 10/2012 | Itaya | ................. | G03G 15/2053 |
| | | | | 399/68 |
| 2018/0239289 A1* | 8/2018 | Takada | ............... | H04N 1/00612 |
| 2021/0306512 A1* | 9/2021 | Sato | ................ | G06K 19/07773 |

* cited by examiner

IMAGE FORMING DEVICE

CROSS-REFERENCE TO RELATED APPLICATION

This application is based upon and claims the benefit of priority from Japanese Patent Application No. 2021-126477, filed on Aug. 2, 2021, the entire contents of which are incorporated herein by reference.

FIELD

Embodiments described herein relate generally to an image forming device, a wireless tag processing device, and methods related thereto.

BACKGROUND

There is an image forming device capable of writing and reading information to and from a wireless tag of a sheet having a wireless tag. If the image forming device fails to write and read data to and from the wireless tag, the image forming device determines that the sheet having a wireless tag is defective. If it is determined that the wireless tag is defective, the defective sheet having a wireless tag is processed by printing image information indicating the defect on the sheet having a wireless tag or physically destroying the wireless tag by a stapler or a shredder.

However, in such processing, destruction performed by the stapler may be insufficient and information in the wireless tag may leak, it may take time to perform the processing of the stapler when the sheet is reused as a normal sheet, and the sheet cannot be reused as a normal sheet because the sheet is pulverized by the shredder.

DETAILED DESCRIPTION

In general, according to one embodiment, an image forming device capable of reducing resources related to destruction of a wireless tag is provided.

In order to solve the above problem, an image forming device according to the present embodiment includes a reader and writer, a fixing unit, a determination unit, and a control unit. The reader and writer reads information from a wireless tag. The fixing unit heats and conveys a sheet having the wireless tag. The determination unit determines a defect of the wireless tag based on a reading result of the reader and writer. If the determination unit determines that the wireless tag is defective, the control unit controls the fixing unit to increase an amount of heat applied to the wireless tag such that information cannot be read from the wireless tag.

Hereinafter, an embodiment of an image forming device will be described with reference to drawings.

The present embodiment is a case in which a multi functional peripheral (MFP) is an aspect of an image forming device.

A sheet includes a sheet having a wireless tag.

Figure 1:
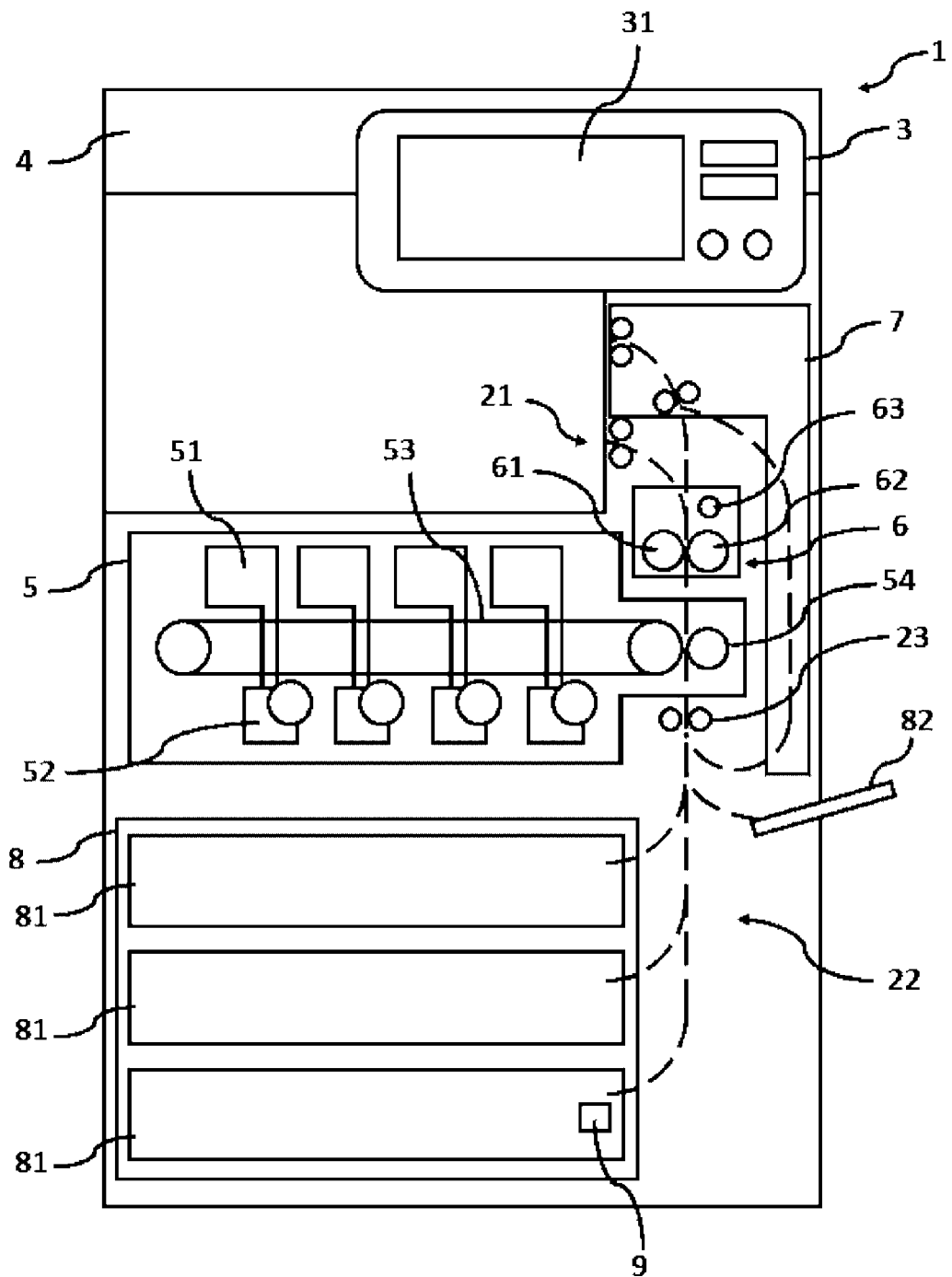
FIG. 1 is a schematic diagram showing a configuration of an MFP according to an embodiment.

FIG. 1 is a schematic view showing a configuration of a MFP 1. As shown in FIG. 1, the MFP 1 includes a conveying unit 2, a control panel 3, a scanner 4, an image forming unit 5, a fixing unit 6, a reversing unit 7, a sheet feeding unit 8, and a reader and writer 9.

Figure 2:
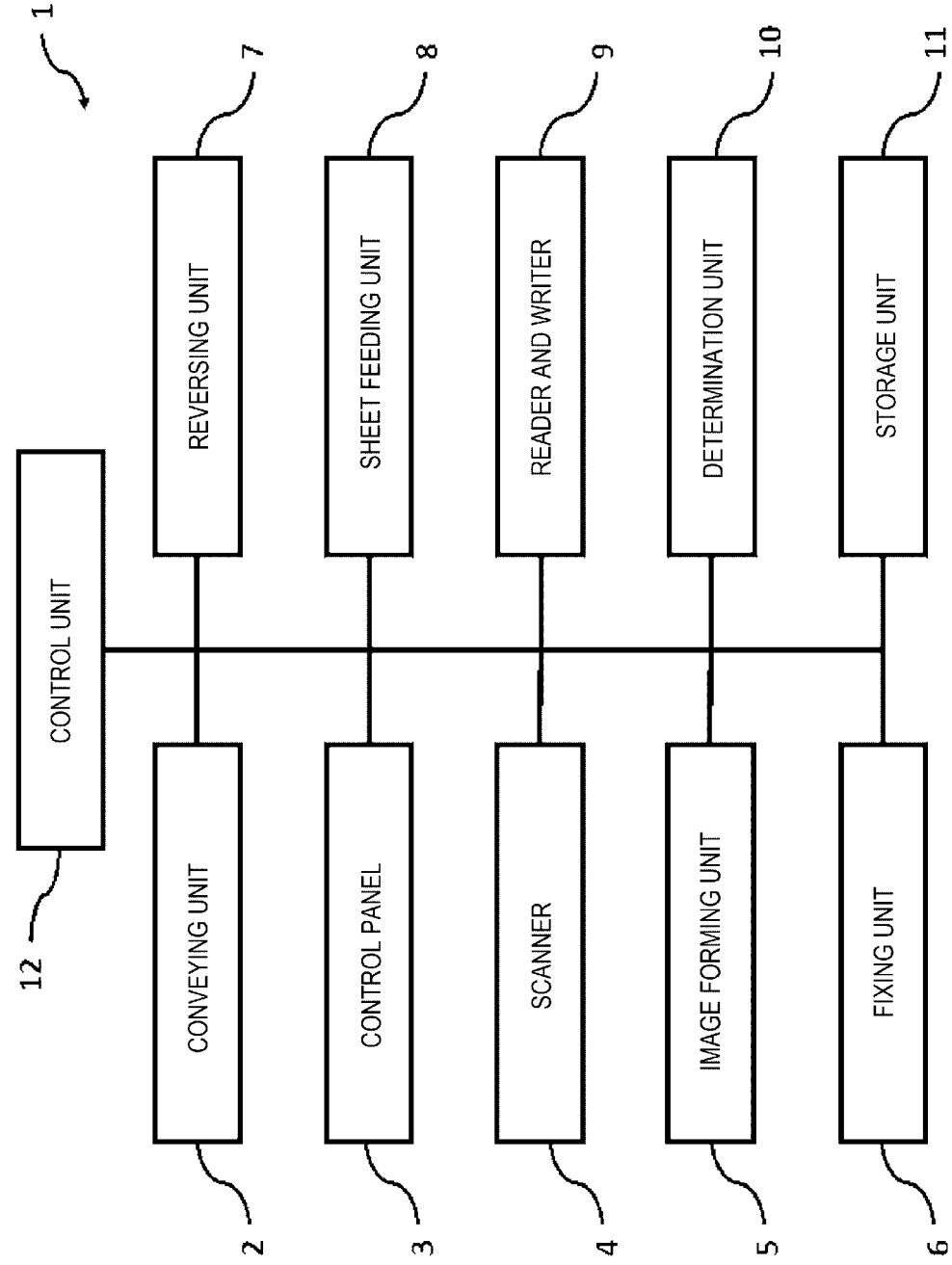
FIG. 2 is a block diagram showing a hardware configuration.

FIG. 2 is a block diagram showing a hardware configuration of the MFP 1. As shown in FIG. 2, the MFP 1 further includes a control unit 12, a storage unit 11, and a determination unit 10.

The control unit 12 includes a processor including a central processing unit (CPU) or a micro processing unit (MPU), and a memory. The memory is, for example, a semiconductor memory, and includes a read only memory (ROM) that stores various control programs and a random access memory (RAM) that provides a temporary work region to the processor. The control unit 12 controls each unit of the MFP 1 based on the various programs and the like stored in the ROM.

The storage unit 11 is, for example, an hard disc drive (HDD) or an solid state drive (SSD). The storage unit 11 acquires, for example, image data acquired or generated by each configuration of the MFP 1.

The conveying unit 2 includes a conveyance path 22 that connects the sheet feeding unit 8, the image forming unit 5, the fixing unit 6, and a sheet discharge port 21. The conveying unit 2 conveys a sheet fed from the sheet feeding unit 8 along the conveyance path 22. The conveying unit 2 includes a plurality of conveyance rollers at positions in the conveyance path 22 as a conveyance unit that conveys a sheet. In a sheet conveying direction, the sheet feeding unit 8 is provided upstream, and the sheet discharge port 21 is formed downstream. The conveying unit 2 includes a registration roller 23. The registration roller 23 is provided upstream of the image forming unit 5 in the sheet conveying direction. The registration roller 23 temporarily stops the conveyed sheet and operates at any timing by the control unit 12 to convey the sheet to the image forming unit 5.

The control panel 3 includes a plurality of buttons that receive an operation of a user. The control panel 3 outputs a signal corresponding to an operation performed by the user to the control unit 12 of the MFP 1. The control panel 3 is configured as a touch panel integrated with a display 31. The display 31 displays information on the MFP 1. The display 31 is an image display device such as a liquid crystal display or an organic electro luminescence (EL) display.

The scanner 4 reads an image of a document. The scanner 4 includes, for example, an auto document feeder (ADF) or a dual scan document feeder (DSDF). Information of the read image may be transmitted to an external device such as a personal computer (PC) via a network. The information of the read image may be stored in the storage unit 11, and may be printed as an image on the sheet by the image forming unit 5 and the fixing unit 6.

The image forming unit 5 forms a toner image on the sheet based on image information transmitted from an external device such as the scanner 4 or a PC. The image forming unit 5 includes a plurality of toner cartridges 51, a plurality of developing devices 52, a transfer belt 53, and a transfer roller 54. The plurality of toner cartridges 51 each include, for example, a respective one of toners of different colors. The developing device supplies the toner supplied from the toner cartridge 51 to the transfer belt 53 to form a toner image. The toner image formed on the transfer belt 53 moves toward the transfer roller 54 by the annular rotation of the transfer belt 53. The toner image formed on the transfer belt 53 is transferred onto the conveyed sheet by the transfer roller 54. The control unit 12 controls the registration rollers 23 to convey the sheet such that the toner image on the transfer belt 53 is transferred to a predetermined position of the sheet.

The fixing unit 6 includes a heat roller 61 and a first press roller 62. The fixing unit 6 sandwiches the sheet between the heat roller 61 and the first press roller 62 and conveys the sheet while applying heat and pressure, thereby fixing the toner image formed on the sheet. The heat roller 61 includes a fixing belt 611 and an induction heating (IH) coil. The heat roller 61 heats the fixing belt 611 by induction heating using an IH coil 612. The heat roller 61 may be of a type in which the fixing belt 611 is directly heated by a heater that generates heat.

Figure 3:
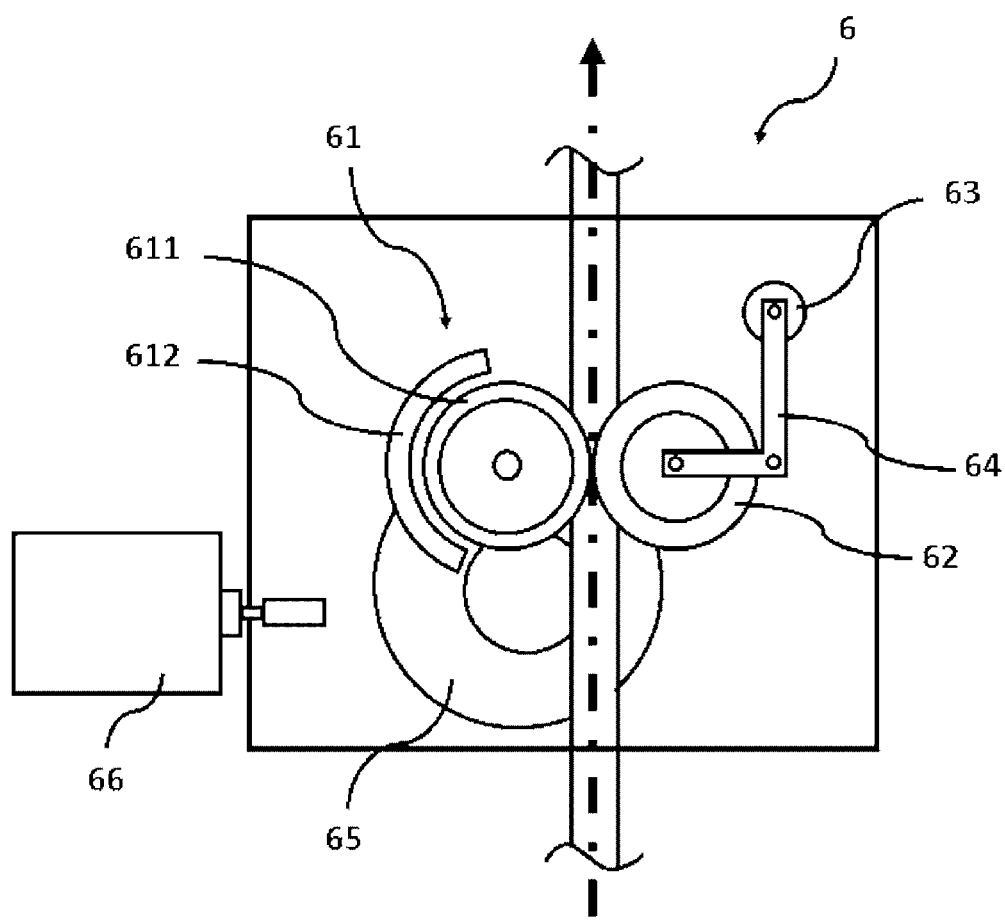
FIG. 3 is a schematic diagram (first posture) of a fixing unit.
Figure 4:
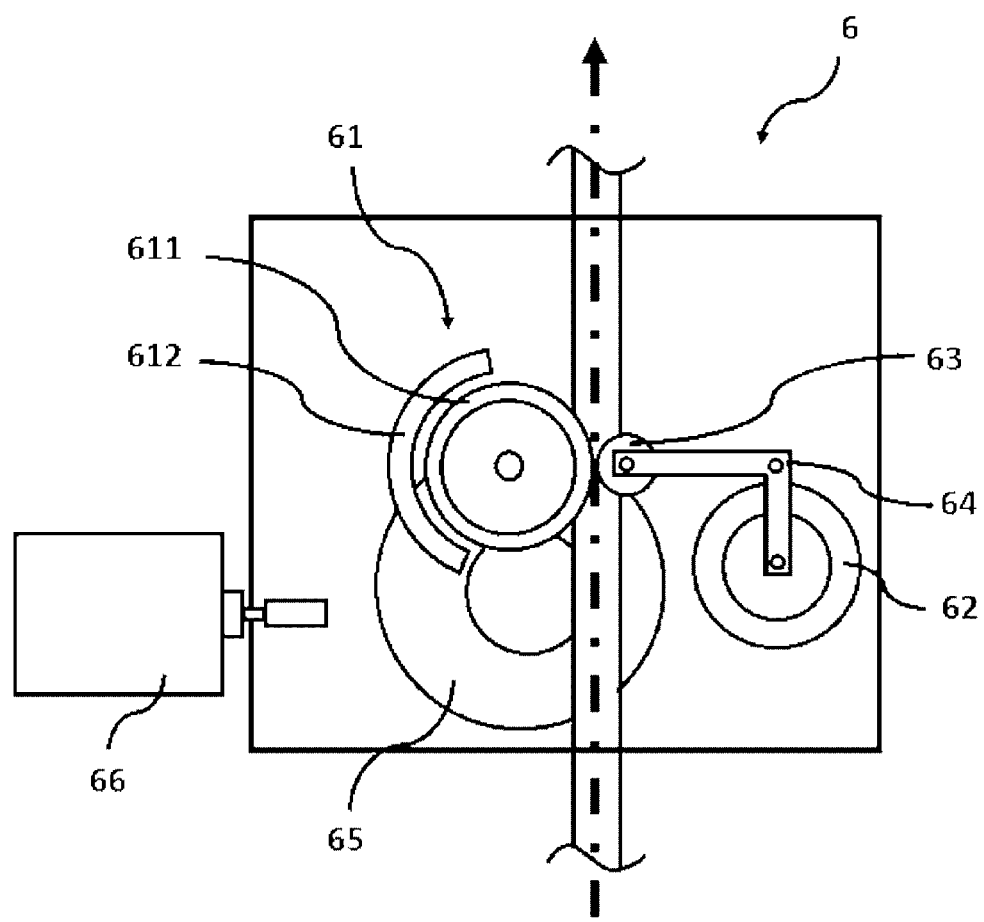
FIG. 4 is a schematic diagram (second posture) of the fixing unit.

FIGS. 3 and 4 are schematic diagrams of the fixing unit 6 provided in the MFP 1 shown in FIG. 1. As shown in FIG. 3, a state in which the heat roller 61 and the first press roller 62 face each other is referred to as a first posture. As shown in FIG. 4, a state in which the heat roller 61 and a second press roller 63 face each other is referred to as a second posture.

The fixing unit 6 includes a second press roller 63. The fixing unit 6 sandwiches the sheet having a wireless tag between the heat roller 61 and the second press roller 63 and conveys the sheet while applying heat and pressure, thereby breaking the wireless tag. The fixing unit 6 fixes the toner image formed on the sheet.

The temperature at which the wireless tag is destroyed is higher than the temperature suitable for fixing the toner on the sheet in the normal printing. When the wireless tag is destroyed by heat, the control unit 12 controls the temperature of the fixing unit 6 such that the amount of heat given to the sheet having a wireless tag is larger than the amount of heat in the case of performing the normal printing. When the wireless tag is destroyed by heat, the control unit 12 controls the temperature of the fixing unit 6 such that the amount of heat applied to the sheet having a wireless tag is higher than the heat resistant temperature of the wireless tag and lower than the temperature at which the sheet burns. The fixing in the normal printing means that the MFP 1 fixes the image on the sheet with an amount of heat that does not destroy the wireless tag of the sheet having a wireless tag.

The fixing unit 6 includes an arm 64. The arm is a member that couples the first press roller 62 and the second press roller 63. When the arm 64 rotates, the first posture and the second posture are switched.

The second press roller 63 is smaller in diameter than the first press roller 62. Since the diameter of the second press roller 63 is smaller than that of the first press roller 62, the second press roller 63 is less likely to disperse heat, and can efficiently apply heat to the sheet having a wireless tag. The size of the diameter of the second press roller 63 is not limited as long as the second press roller 63 can apply predetermined heat to the wireless tag by sandwiching the sheet having a wireless tag between the heat roller 61 and the second press roller 63.

The second press roller 63 has a higher thermal conductivity as compared with the first press roller 62. Since the second press roller 63 has a higher thermal conductivity as compared with the first press roller 62, the temperature of the second press roller 63 is likely to rise, and the second press roller 63 can efficiently apply heat to the sheet having a wireless tag. The thermal conductivity or the material to be used for the second press roller 63 is not limited as long as the second press roller 63 can apply predetermined heat to the wireless tag by sandwiching the sheet having a wireless tag between the heat roller 61 and the second press roller 63.

The fixing unit 6 includes a fixing unit motor 65 and a nip pressure motor 66. The fixing unit motor 65 rotates the heat roller 61. The control unit 12 controls the fixing unit motor 65. The control unit 12 controls a rotation speed of the fixing unit motor 65 to adjust a conveyance speed of the sheet conveyed by the fixing unit 6. The nip pressure motor 66 moves the first press roller 62 or the second press roller 63 facing the heat roller 61 in conjunction with a rotation of the nip pressure motor 66. The first press roller 62 or the second press roller 63 facing the heat roller 61 moves in a direction in which the first press roller 62 or the second press roller 63 abuts against the heat roller 61 or a direction in which the first press roller 62 or the second press roller 63 separates from the heat roller 61. The control unit 12 adjusts a nip pressure by controlling the nip pressure motor 66.

The fixing unit 6 may increase the nip pressure if the sheet having a wireless tag is sandwiched between the heat roller 61 and the second press roller 63. By increasing the nip pressure, the heat roller 61 and the second press roller 63 are further pressed against each other, and the contact area between the heat roller 61 and the second press roller 63 increases. Accordingly, the distance for the heat roller 61 and the second press roller 63 to apply heat to the sheet having a wireless tag can be increased in the sheet conveying direction. That is, heat can be efficiently applied to the sheet having a wireless tag.

The reversing unit 7 reverses the sheet when printing is performed on both sides of the sheet. Specifically, a sheet discharge path is branched into a conveyance path along which the sheet is conveyed to the sheet discharge port 21 and a conveyance path along which the sheet is conveyed to the reversing unit 7, and the sheet on which duplex printing is performed is guided to the conveyance path along which the sheet is conveyed to the reversing unit 7. The sheet conveyed to the reversing unit 7 is conveyed upstream of the registration rollers 23 in the sheet conveying direction. The surface of the sheet passing through the reversing unit 7 is reversed from the surface of the sheet when the sheet is fed from the sheet feeding unit 8. The reversing unit 7 is an automatic duplexing unit (ADU).

The sheet feeding unit 8 accommodates sheets on which images are to be printed. The sheet feeding unit 8 includes a plurality of sheet feed cassettes 81 and a manual feed tray 82. The sheet on which the image is printed may be a sheet accommodated in the sheet feeding unit 8 or a sheet manually fed to the manual feed tray 82. The sheet is conveyed from the sheet feeding unit 8 or the manual feed tray 82 along the conveyance path 22, and is conveyed to the sheet discharge port 21 via the image forming unit 5 and the fixing unit 6. In the embodiment, the sheet having a wireless tag is accommodated in the lowermost sheet feed cassette 81.

The reader and writer 9 writes information to the wireless tag. The reader and writer 9 reads information written in the wireless tag. The reader and writer 9 temporarily stores the information written in the wireless tag and the information read from the wireless tag in the storage unit 11. While the reader and writer 9 writes information to the wireless tag and reads information from the wireless tag, it is desirable to reduce the speed at which the sheet having a wireless tag including the wireless tag is conveyed or stop the conveyance. In the embodiment, the reader and writer 9 is provided in the vicinity of the entrance to the conveyance path 22 in the lowermost sheet feeding cassette 81. The reader and writer 9 may be provided, for example, in the vicinity of the manual feed tray 82, in the vicinity of the registration roller 23, or in the vicinity of the conveyance path 22 related to the reversing unit 7.

The determination unit 10 determines whether the wireless tag of the sheet having a wireless tag is defective. The determination unit 10 compares the information written in the wireless tag by the reader and writer 9 with the information read from the wireless tag by the reader and writer 9. If the written information does not match the read information, the determination unit 10 determines that the wireless tag is defective.

Figure 5:
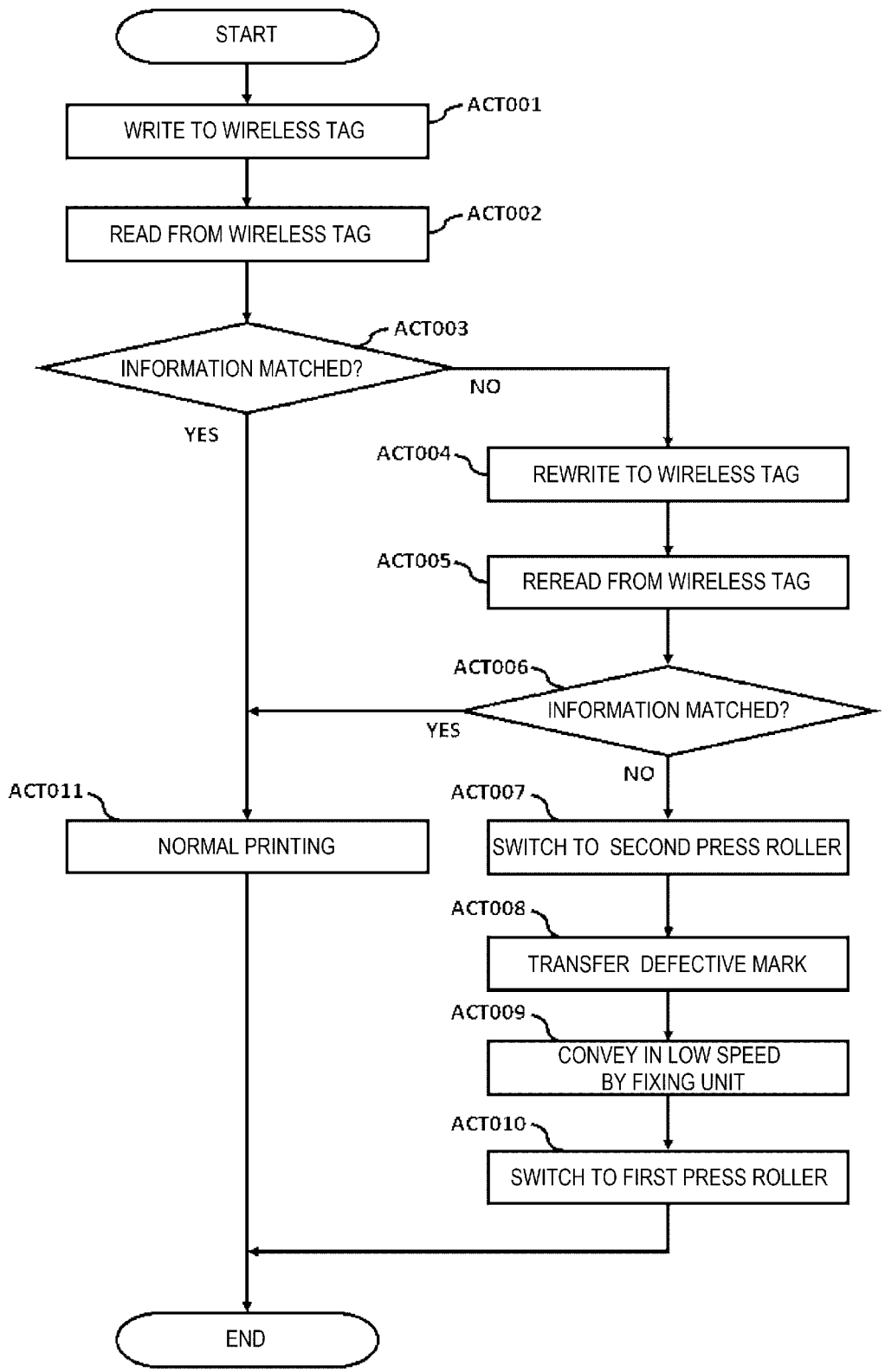
FIG. 5 is a flowchart showing a specific example of an operation.

FIG. 5 is a flowchart showing a specific example of an operation of the MFP 1 according to the embodiment. An operation when the MFP 1 performs printing of an image and writing of information on the sheet having a wireless tag will be described with reference to FIG. 5.

The MFP 1 receives a print job. The MFP 1 feeds one sheet having a wireless tag from the lowermost sheet feed cassette 81, and moves the sheet having a wireless tag to a position where the reader and writer 9 can write and read information to and from the wireless tag. The reader and writer 9 writes information to the wireless tag of the sheet having a wireless tag (ACT 001). The reader and writer 9 reads the information for checking whether the information is normally written in the wireless tag. That is, verification is executed (ACT 002).

If the information written in the wireless tag by the reader and writer 9 does not match the information read from the wireless tag (ACT 003, NO), the reader and writer 9 writes the information in the wireless tag again (ACT 004). Again, the reader and writer 9 reads the information for checking whether the information is normally written in the wireless tag. That is, verification is executed (ACT 005). When the information written in the wireless tag by the reader and writer 9 does not match the information read from the wireless tag (ACT 006, NO), the determination unit 10 determines that the wireless tag is defective. In this way, writing and reading of information to and from the wireless tag are executed twice in order to reduce discarding of a normal sheet having a wireless tag due to erroneous determination.

Figure 6:
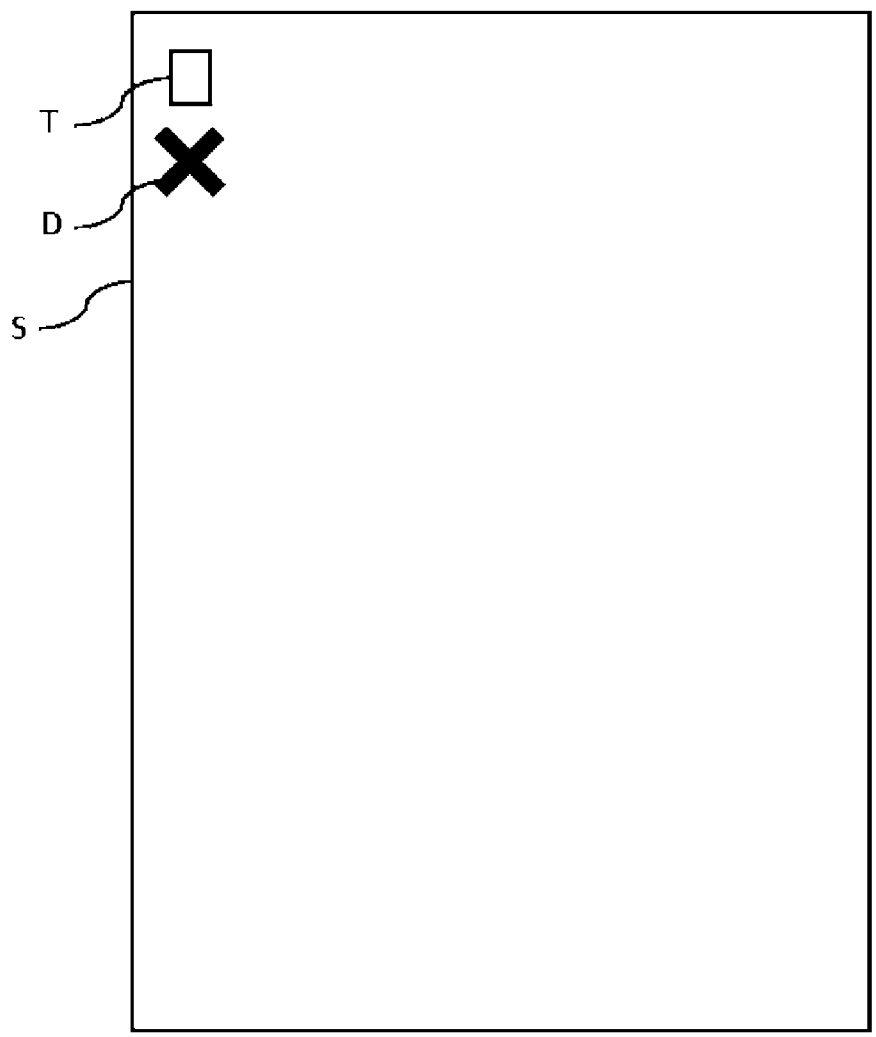
FIG. 6 is a diagram showing an example of a defective mark printed on a sheet having a wireless tag.

If it is determined that the wireless tag is defective, the fixing unit 6 switches the press roller from the first press roller 62 to the second press roller 63 (ACT 007). That is, as shown in FIGS. 3 and 4, the fixing unit 6 is switched from the first posture to the second posture. The image forming unit 5 does not form a toner image of the image to be originally transferred to the sheet having a wireless tag, forms the toner image of the image (defective mark) indicating that the wireless tag is defective, and transfers the toner image to the conveyed sheet having a wireless tag (ACT 008). For example, FIG. 6 is a diagram showing an example of a defective mark printed on the sheet having a wireless tag. FIG. 6 shows a sheet S having a wireless tag, a wireless tag T, and a defective mark D.

The fixing unit 6 conveys the sheet having a wireless tag conveyed from the image forming unit 5 along the conveyance path 22 while applying heat to the sheet having a wireless tag. A conveyance speed at this time is set to be lower than the normal printing speed (ACT 009). Accordingly, the fixing unit 6 applies heat to the sheet having a wireless tag such that the temperature of the sheet having a wireless tag becomes equal to or higher than a heat resistant temperature of the wireless tag, and breaks the wireless tag. Further, the defective mark is fixed to the sheet having a wireless tag. The defective mark may be fixed on the sheet having a wireless tag determined to be defective to the extent that the user can recognize the defective mark, and the accuracy of the fixing is not required.

When the sheet having a wireless tag is conveyed by the heat roller 61 and the second press roller 63, the fixing unit 6 switches the press roller from the second press roller 63 to the first press roller 62 (ACT 010). That is, the fixing unit 6 is switched from the second posture to the first posture. The sheet having a wireless tag passing through the fixing unit 6 is discharged from the sheet discharge port 21 by the conveying unit 2.

When the information written in the wireless tag by the reader and writer 9 matches the information read from the wireless tag (ACT 003, YES), the determination unit 10 determines that the wireless tag is not defective.

When the determination unit 10 determines that the wireless tag is not defective, the MFP 1 performs the normal printing based on a print job (ACT 011).

In the embodiment, the amount of heat to be applied to the wireless tag is increased by decreasing the speed at which the fixing unit conveys the sheet. Alternatively, the amount of heat to be applied to the wireless tag may be increased by increasing the temperature of the heat roller 61.

In the embodiment, the sheet having a wireless tag determined to be defective is conveyed by the fixing unit 6 at a speed lower than a normal printing speed. Alternatively, the conveyance speed may be reduced only when the region to which the wireless tag determined to be defective is attached is sandwiched by the heat roller 61 and the second press roller 63. The region to which the wireless tag is attached is based on a predetermined position of the wireless tag attached to the conveyed sheet having a wireless tag. The conveyed sheet having a wireless tag is defined by the settings of the control panel 3 and the sheet feed cassette 81. The timing at which the conveyance speed is reduced is based on the timing at which the reader and writer 9 reads and writes information from and to the wireless tag and the timing at which the registration roller 23 is driven.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the disclosure. These embodiments and modifications thereof are included in the scope and spirit of the disclosure and are also included in the disclosure described in the claims and an equivalent scope thereof.

What is claimed is:

1. An image forming device, comprising:
 a reader and writer configured to read information from a wireless tag;
 a fixing component configured to heat and convey a sheet having the wireless tag;
 a determination component configured to determine a defect of the wireless tag based on a reading result of the reader and writer; and
 a controller configured to control the fixing component to increase an amount of heat applied to the wireless tag such that information is unreadable from the wireless tag if the determination component determines that the wireless tag is defective, wherein
 the fixing component includes a heat roller configured to heat an object, a first press roller, and a second press roller, and the controller switches from a first posture in which the heat roller and the first press roller face each other to a second posture in which the heat roller and the second press roller face each other if the determination component determines that the wireless tag is defective.

2. The image forming device according to claim 1, wherein
the reader and writer writes information to the wireless tag, and
the determination component determines that the wireless tag is defective if the information written in the wireless tag by the reader and writer and the information read from the wireless tag do not match, or if the information is unreadable from the wireless tag by the reader and writer.

3. The image forming device according to claim 1, wherein
the amount of heat applied to the wireless tag increases more in the second posture than in the first posture.

4. The image forming device according to claim 1, wherein
the second press roller has a smaller diameter as compared with the first press roller.

5. The image forming device according to claim 1, further comprising:
an image forming component configured to form an image on the sheet, wherein
the controller controls the image forming component to form the image indicating that the wireless tag is defective on the sheet having the wireless tag if the determination component determines that the wireless tag is defective.

6. The image forming device according to claim 1, wherein
the controller controls the fixing component to increase the amount of heat applied to the wireless tag to a wireless tag destruction temperature, which is higher than an image fixing temperature.

7. A method for an image forming device, comprising:
reading information from a wireless tag using a reader and writer;
heating and conveying a sheet having the wireless tag;
determining a defect of the wireless tag based on a reading result of the reader and writer; and
controlling the heating to increase an amount of heat applied to the wireless tag such that information is unreadable from the wireless tag if the wireless tag is determined defective,
the method further comprising:
heating an object;
heating a first press roller;
heating a second press roller; and
switching from a first posture in which a heat roller and the first press roller face each other to a second posture in which the heat roller and the second press roller face each other if the wireless tag is determined defective.

8. The method according to claim 7, further comprising:
writing information to the wireless tag; and
determining that the wireless tag is defective if the information written in the wireless tag and the information read from the wireless tag do not match, or if the information is unreadable from the wireless tag by the reader and writer.

9. The method according to claim 7, wherein
the amount of heat applied to the wireless tag increases more in the second posture than in the first posture.

10. The method according to claim 7, further comprising:
forming an image on the sheet; and
controlling and image forming component to form the image indicating that the wireless tag is defective on the sheet having the wireless tag if the wireless tag is determined defective.

11. The method according to claim 7, further comprising:
controlling a fixing component to increase the amount of heat applied to the wireless tag to a wireless tag destruction temperature, which is higher than an image fixing temperature.

12. A wireless tag processing device, comprising:
a reader and writer configured to read information from a wireless tag;
a heating component configured to heat a sheet having the wireless tag;
a determination component configured to determine a defect of the wireless tag based on a reading result of the reader and writer; and
a controller configured to control the heating component to increase an amount of heat applied to the wireless tag such that information is unreadable from the wireless tag if the determination component determines that the wireless tag is defective, wherein
the heating component includes a heat roller configured to heat an object, a first press roller, and a second press roller, and
the controller switches from a first posture in which the heat roller and the first press roller face each other to a second posture in which the heat roller and the second press roller face each other if the determination component determines that the wireless tag is defective.

13. The wireless tag processing device according to claim 12, wherein
the reader and writer writes information to the wireless tag, and
the determination component determines that the wireless tag is defective if the information written in the wireless tag by the reader and writer and the information read from the wireless tag do not match, or if the information is unreadable from the wireless tag by the reader and writer.

14. The wireless tag processing device according to claim 12, wherein
the amount of heat applied to the wireless tag increases more in the second posture than in the first posture.

15. The wireless tag processing device according to claim 12, wherein
the second press roller has a smaller diameter as compared with the first press roller.

16. The wireless tag processing device according to claim 12, further comprising:
an image forming component configured to form an image on the sheet, wherein
the controller controls the image forming component to form the image indicating that the wireless tag is defective on the sheet having the wireless tag if the determination component determines that the wireless tag is defective.

17. The wireless tag processing device according to claim 12, wherein
the controller controls the heating component to increase the amount of heat applied to the wireless tag to a wireless tag destruction temperature, which is higher than an image fixing temperature.

* * * * *